United States Patent
Syrjärinne et al.

(10) Patent No.: US 9,465,114 B2
(45) Date of Patent: Oct. 11, 2016

(54) TIMED-BASED EPHEMERIS IDENTITY IN ASSISTANCE DATA AND ASSISTANCE DATA REQUEST MESSAGES

(75) Inventors: Jari Syrjärinne, Tampere (FI); Ismo Halivaara, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1095 days.

(21) Appl. No.: 11/978,207

(22) Filed: Oct. 26, 2007

(65) Prior Publication Data

US 2008/0228398 A1    Sep. 18, 2008

Related U.S. Application Data

(60) Provisional application No. 60/856,623, filed on Nov. 3, 2006.

(51) Int. Cl.
| | |
|---|---|
| *G01S 19/07* | (2010.01) |
| *G01S 19/25* | (2010.01) |
| *G01S 19/05* | (2010.01) |

(52) U.S. Cl.
CPC ............ *G01S 19/258* (2013.01); *G01S 19/05* (2013.01)

(58) Field of Classification Search
CPC ....... G01S 19/08; G01S 19/05; G01S 19/258
USPC .................................................... 342/357.44
See application file for complete search history.

(56) References Cited

U.S. PATENT DOCUMENTS

| | | | |
|---|---|---|---|
| 6,295,024 B1 * | 9/2001 | King et al. ............... | 342/357.64 |
| 6,313,787 B1 | 11/2001 | King et al. | |
| 6,429,808 B1 * | 8/2002 | King et al. ............... | 342/357.44 |
| 7,064,706 B2 | 6/2006 | King et al. | |
| 2002/0142783 A1 | 10/2002 | Yoldi et al. | |
| 2002/0168985 A1 | 11/2002 | Zhao et al. ................... | 455/456 |
| 2007/0063894 A1 * | 3/2007 | Yu ........................... | 342/357.15 |
| 2010/0302099 A1 * | 12/2010 | Grossnickle et al. ... | 342/357.46 |

OTHER PUBLICATIONS

A. Zinoviev; "Using GLONASS in Combined GNSS Receivers: Current Status;" Ion GNSS $18^{th}$ International Technical Meeting of the Satellite Division; Sep. 16, 2005; pp. 1046-1057.

3GPP TS 49.031 V7.2.0 (May 2006); $3^{rd}$ Generation Partnership Project; Technical Specification Group GSM/EDGE Radio Access Network; Location Services (LCS); Base Station System Application Part LCS Extension (BSSAP-LE) (Release 7).

(Continued)

*Primary Examiner* — Frank J McGue
(74) *Attorney, Agent, or Firm* — Alston & Bird LLP

(57) ABSTRACT

A module (software or ASIC) for use in a serving mobile Location Center (SMLC) or a mobile station having a GPS receiver (or an A-GPS receiver) for determining an ITOW for a CNAV-1 signal. Also provided is a module for a mobile with GPS (or A-GPS receiver) so that the mobile can use the ITOW (either the ITOW provided with the CNAV-2, or that calculated for the CNAV-1) to uniquely identify ephemeris information in a request for assistance message. Also provided is a module for a SMLC by which the SMLC can use the IOD fields in the assistance data messages in a way that uniquely identifies the associated ephemeris information.

22 Claims, 5 Drawing Sheets

(56) References Cited

OTHER PUBLICATIONS

3GPP TS 44.031 V7.2.0 (Nov. 2005); 3$^{rd}$ Generation Partnership Project; Technical Specification Group GSM/EDGE Radio Access Network; Location Services (LCS); Mobile Station (MS—Serving Mobile Location Centre (SMLC) Radio Resource LCS Protocol (RRLP) (Release 7).
3GPP TSG-GERAN WG2 Meeting #31bis; Turin, Italy, Oct. 16-20, 2006; G2-060315 Agenda: 5.3.10; Change Request 44.031 CR 0146; Rev. 2; Version 7.2.0.
3GPP TSG-GERAN WG2 Meeting #31bis; Turin, Italy, Oct. 16-20, 2006; G2-060316 Agenda: 5.3.10; Change Request 49.031 CR 0045; Rev. 2; Version 7.2.0.
3GPP TSG-GERAN2 Meeting #31bis; Turin, Italy, Oct. 16-20, 2006; Tdoc G2-060274; Change Request 49.031 CR 0047; Rev. -; Version 7.2.0.
3GPP TSG-GERAN2 Meeting #31bis; Turin, Italy, Oct. 16-20, 2006; Tdoc G2-060273; Change Request 44.031 CR 0145; Rev. 2; Version 7.2.0.
Office Action from Chinese Patent Application No. 200780046380.0, dated Mar. 31, 2012.
Office Action from Vietnamese Patent Application No. 1-2009-01162, dated Nov. 11, 2009.
Office Action from Chinese Patent Application No. 200780046380.0, dated May 31, 2011.
Office Action for Indian Application No. 2534/CHENP/2009 dated Oct. 21, 2014.
International Search Report and Written Opinion for Application No. PCT/IB2007/003243 dated Jun. 9, 2008.
Office Action for European Application No. 07 858 850.6 dated Jun. 4, 2015.
Office Action for European Application No. 07 858 850.6 dated Nov. 3, 2011.
Global Navigation Satellite System GLONASS Interface Control Document, Version 5 (2002) 54 pages.
IS-GPS-200, Revision D, Navstar GPS Space Segment/Navigation User Interfaces (Mar. 7, 2006) 221 pages.
Office Action for Ukraine Application No. 200904905 dated Jan. 18, 2012.

\* cited by examiner

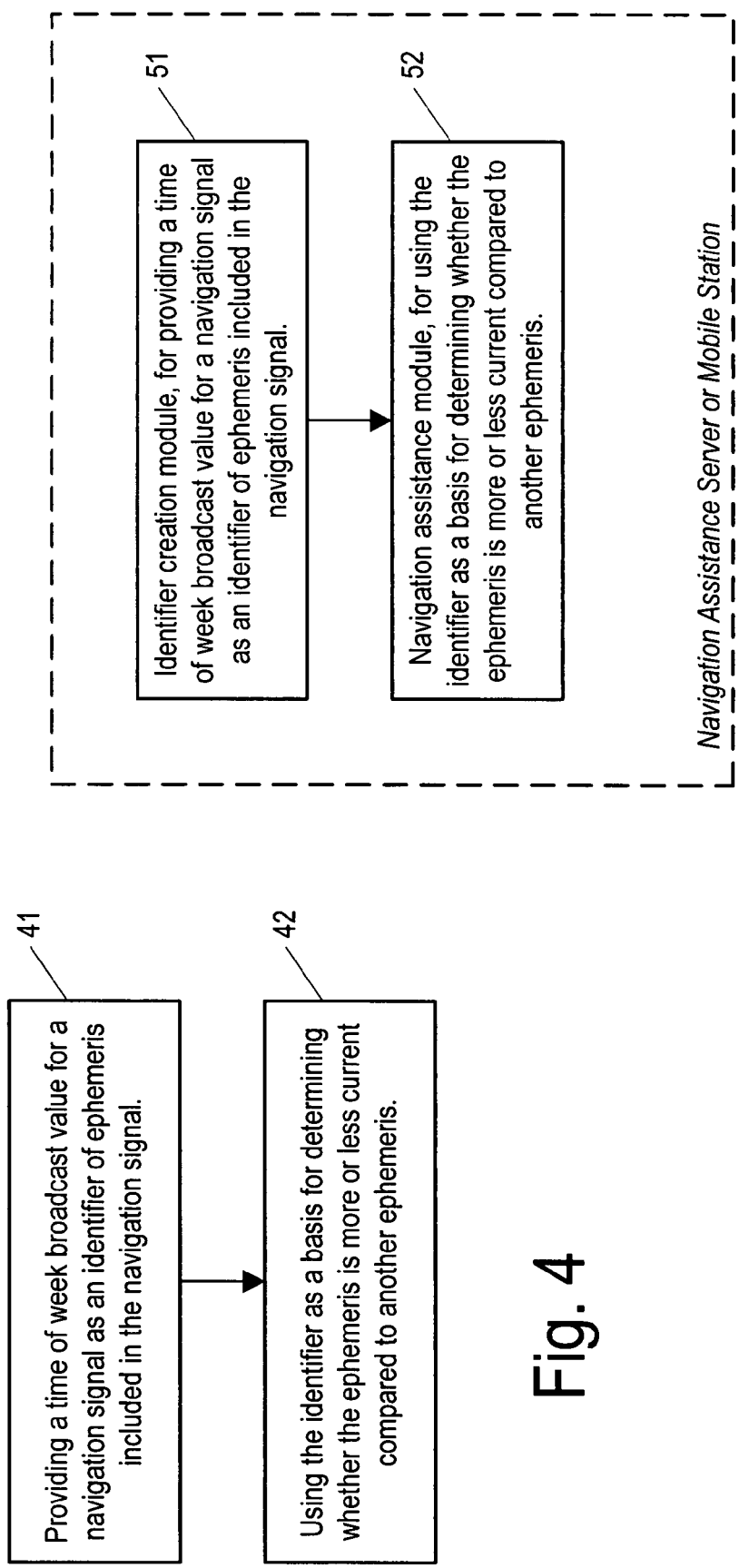

TIMED-BASED EPHEMERIS IDENTITY IN ASSISTANCE DATA AND ASSISTANCE DATA REQUEST MESSAGES

CROSS REFERENCE TO RELATED APPLICATION

Reference is made to and priority claimed from U.S. provisional application Ser. No. 60/856,623 filed Nov. 3, 2006.

FIELD OF THE INVENTION

The present invention relates to the field of navigation using GNSS (e.g. GPS), and in particular using assisted GNSS (e.g. assisted GPS).

BACKGROUND OF THE INVENTION

In what follows, the terminology "GPS" (Global Positioning System) is often used. Depending on the context, such use should be understood to be either the version of GNSS (Global Navigation Satellite System) provided by the United States, i.e. NAVSTAR, commonly called GPS, or else any GNSS, such as e.g. GPS, Galileo, Glonass, SBAS (Space Based Augmentation System), LAAS (Local Area Augmentation System), or QZSS (Quasi-Zenith Satellite System). Also, the acronym "A-GPS" is often used here, and can mean either assisted GNSS, or specifically only assisted GPS.

A-GPS navigation uses an assistance server to cut down the time needed by a ranging receiver (i.e. a GPS receiver) to determine a location fix. A-GPS is useful in urban areas, where a user is often located in so-called urban canyons, or when a user is under heavy tree cover. A-GPS is becoming more common, and is usually associated with Location Based Services (LBSes) provided over cellular or other wireless networks.

A-GPS differs from ordinary (i.e. unassisted) GPS by including an assistance server in the overall system providing GPS signals. In (ordinary) GPS networks, a GPS receiver communicates directly with (receives signals directly from) GPS satellites, so there are only GPS satellites and GPS receivers. In A-GPS networks, an A-GPS receiver communicates with an assistance server, which communicates with (receives signals from) GPS satellites. (The A-GPS receiver might also receive signals directly from the GPS satellites.) The A-GPS receiver and the assistance server share computational tasks, reducing the computational burden on the GPS receiver, but the GPS receiver then has the additional task (compared with a pure GPS receiver) of performing cellular communication with the assistance server.

In a typical A-GPS network, an A-GPS receiver can ask an assistance server, located at what is often called a (serving) Mobile Location Centre (MLC), for the latest ephemeris for a satellite, or for corrections to an ephemeris to allow for a more accurate position fix determination by the A-GPS receiver. When asking for assistance regarding an ephemeris, the A-GPS receiver must unambiguously identify the version of the ephemeris. In the prior art the ephemeris is provided in a so-called L1 GPS signal, and the message providing the ephemeris includes a mechanism of unambiguously referring to the ephemeris. That mechanism is an IOD-E (Issue-of-Data-Ephemeris) information element (IE) within the message. (An IE can also be called a "field," as in a "field of a record"). There are now so-called "modernized" GPS signals, referred to as L2C, L5 and L1C signals and described in IS-GPS-200D (Interface Specification-GPS-200D), IS-GPS705 and IS-GPS-800. These do not include an IOD-E.

Thus, what is needed is a mechanism useable in connection with the modernized GPS signals by which to unambiguously refer to an ephemeris conveyed by a modernized GPS signal.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The invention provides a mobile station (wireless communication terminal) equipped to receive cellular signals from a cellular network or signals from a non-cellular wireless network such as a WLAN (Wireless Local Area Network) or WiMAX (Worldwide Interoperability for Microwave Access) network (WiMAX is a standards-based technology enabling the delivery of last mile wireless broadband access as an alternative to cable and DSL), and equipped to receive ranging signals from navigational beacons (satellites) of a satellite-based GPS. Thus, the mobile station includes a cellular or other wireless component (all referred to herein below as a "wireless" component) and also a GPS component (meaning a GNSS component). The wireless component is configured to communicate with a Serving Mobile Location Center (SMLC) that is part of a wireless network (typically a cellular network) and that includes what is here called an assistance server, for providing assistance to the GPS component of the mobile. Thus, the GPS component of the mobile station is more accurately termed an A-GPS component (or even more accurately as an A-GNSS component).

A mobile station and SMLC according to the invention differ from what is provided by the prior art in that the mobile station and SMLC communicate information not communicated according to the prior art, information of use in identifying the ephemeris data (in respect to how old it is) for which assistance is to be provided to the mobile station by the assistance server. Ephemeris data may be understood to be data used to determine the positions of the GPS satellites, i.e. the orbits of the GPS satellites, and may be (actual) ephemeris or merely information indicative of ephemeris, i.e. what is here called ephemeris information. The mobile station needs to know the orbit of a GPS satellite to use ranging signals from the GPS satellite in determining the location of the mobile station (using the A-GPS component).

The assistance server may provide the mobile station with new or additional ephemeris data, such as corrections to an ephemeris. According to the invention, the assistance server does this using messages that are especially adapted to the so-called modernized GPS signals (L2C, L5 and L1C per IS-GS-200D, IS-GPS-705 and IS-GPS-800). Correspondingly, a mobile station may request new or additional ephemeris data using a message also especially adapted to the modernized GPS signals. More specifically, the invention provides a value for an IE in messages provided by the prior art, a value assigned according to methods not taught by the prior art and that unambiguously identifies ephemeris data.

The GPS may be the U.S. Dept. of Defense Global Positioning System (known by that name), or may be another GPS, as long as it transmits the so-called modernized GPS signals, or their equivalent, i.e. or message that provide the same information.

As explained, the prior art provides messages for unambiguously identifying ephemeris data only in case of pre-modernized signals, i.e. what are called GPS L1 signals, but provides no mechanism by which a mobile or an SMLC can unambiguously identify new or additional ephemeris in case of the modernized signals. The prior art provides an IODC (issue-of-data clock) (10 bits) field and an IODE (issue-of-data ephemeris) (8 LSB of the IODC) as fields in messages related to new or additional ephemeris data. The two in combination allow a mobile to unambiguously determine whether ephemeris information for a satellite has changed, and also enable the mobile to associate a DGPS correction data set with the correct ephemeris information for a satellite.

In the modernized signals, i.e. L2C, L5 and L1C, instead of what is called a "NAV" (navigation) message provided by the pre-modernized signals, there is what is called a "CNAV" message for transmitting (inter alia) ephemeris. A CNAV message is an upgraded version of the earlier NAV message. A CNAV message contains higher precision representation and nominally more accurate data than a NAV message. The same information (time, status, ephemeris, and almanac) is transmitted in the CNAV message as in the NAV message, but a new format is used. Instead of using a frame/subframe architecture as in the NAV message, the CNAV message uses a pseudo-packetized format made up of 12-second 300-bit message packets.

For the L2C and L5 signals, ephemeris is provided in a CNAV-1 message, and in case of L1C, ephemeris is provided in a CNAV-2 message. CNAV-1 does not contain an IOD IE (i.e. neither an IODC nor an IODE IE); the identification of the ephemeris in case a CNAV-1 message is therefore based on the ephemeris age. CNAV-2 does not contain an IODC IE, but does contain an 8-bit IE (or field) called ITOW (Interval Time of Week), providing the number of two-hour time intervals (epochs) that have occurred since the previous week.

The invention provides a mechanism for unambiguously indicating in an assistance data message and in an assistance data requesting message, the version of ephemeris (how old the ephemeris is, i.e. how long ago it was broadcast) in either a CNAV-1 or CNAV-2 message. To distinguish versions of the ephemeris broadcast at different times, the mechanism provided by the invention uses how much time has elapsed since the previous week, i.e. the time interval between the broadcast of the ephemeris and the end of the previous week.

The mechanism can be used to: unambiguously identify different issues of the ephemeris data in assistance data messages, unambiguously identify the different issues of DGNSS corrections and to correctly pair the DGNSS corrections with correct ephemeris data, unambiguously indicate the ephemeris data currently in the mobile station's memory in assistance data requesting messages, and include a warning flag for the cases when the nominal transmission interval has been violated.

The invention is of use in identifying ephemeris in GPS L2C, L5 and L1C or like (SBAS, QZSS) signals, and can also be implemented for some other types of GNSS, such as Galileo.

The invention provides functionality similar to the existing identification mechanism based on IODE (used in case of the pre-modernized L1 GPS signal), so that performance and functionality of the positioning is expected to be similar to GPS L1. A benefit of the invention is that the same message structure (10-bit IODE IE) can be used for both the modernized and pre-modernized signals.

According to the invention, the 8 bits of the ITOW IE in the CNAV-2 are used (in an assistance data message or request for same) to identify the ephemeris provided by the CNAV-2 (i.e. to act as a tag), and an 8-bit ITOW for CNAV-1 is derived by the SMLC and mobile from the satellite broadcast of the CNAV-1 (i.e. it is calculated by the SMLC and mobile, based on when the CNAV-1 broadcast is received by them). The range of CNAV-1 "ITOW" is defined from 0 to 84 similar to ITOW in IS-GPS-800 of 19 Apr. 2006, p. 48, Chapter 3.5.3.2, which is as follows:

Bits 14 through 21 of subframe 2 shall contain 8 bits representing ITOW count defined as being equal to the number of two-hour epochs that have occurred since the transition from the previous week. The count is short-cycled such that the range of the ITOW-count is from 0 to 84 2-hour epochs (equaling one week) and is reset to zero at the end of each week. The ITOW-count's zero state is defined as that 2-hour epoch which is coincident with the start of the present week. This epoch occurs at (approximately) midnight Saturday night-Sunday morning, where midnight is defined as 0000 hours on the UTC scale that is nominally referenced to the Greenwich Meridian.

An assistance data message can be e.g. a GNSS (Navigation) message (Table 3) or a DGNSS (Corrections) message (Table 4). Both are defined already to include a 10-bit IOD IE.

According to the invention, 8 of the 10 bits of this IOD (typically the 8 LSB) are to convey the 8-bit ITOW as in the invention, i.e. serving as the IODE as described above. Further, the request for assistance message (Table 5), also includes an IOD IE, and the mobile is to use this IE to convey the ITOW/IODE according to the invention.

The invention thus provides a module (software or ASIC) for use in a SMLC or a mobile for determining an ITOW value for a CNAV-1 signal, or for obtaining an ITOW value from a CNAV-2 signal. Such a module may be called an IOD-E creation module. The IOD-E creation module may be essentially the same for both a mobile station and the SMLC. The invention also provides a module for a mobile station so that the mobile station can use the IOD-E so created (i.e. an ITOW value either derived or obtained—either the ITOW provided with the CNAV-2, or that calculated for the CNAV-1) to uniquely identify ephemeris data in a request for assistance message. This is called here the mobile station navigation assistance module. Finally, the invention provides a module for a SMLC by which the SMLC can use the IOD IE in the assistance data messages in a way that uniquely identifies the associated ephemeris. This is called the SMLC navigation assistance module. The mobile station and SMLC navigation assistance modules are different because the mobile station A-GPS requests assistance and then parses the received assistance, whereas the SMLC provides assistance upon request.

The modules provided by the invention may be implemented as either independent software modules (stored in a memory device of the mobile station or an SMLC server, for loading into executable memory to provide instructions for processing of a processor), or as hardware modules, e.g. an application specific integrated circuit (ASIC), or modules that are a component of other modules included in the mobile station or a server of the SMLC, i.e. a machine including memory for holding data and instructions and a processor for executing instructions stored in memory, after loading the instructions into executable memory. Further, the modules for a mobile station may be provided as a single module or may be provided in combination with other modules of the mobile station, and likewise for the SMLC.

The mobile station may be a device that serves only as a ranging receiver (i.e. what is commonly called a GPS and is here called an A-GPS receiver) and includes only that cellular communication functionality required to request and obtain assistance from the SMLC, with which it communicates via e.g. a radio access network component of the cellular communication network, or the mobile station may be a full-featured cellular communication terminal that, as an added feature, includes a ranging receiver (commonly typically called a GPS or GPS receiver).

The mobile station may use one processor for processing ranging signals (signals received from a satellite of the GPS by a ranging receiver, indicative of the distance between the satellite and the ranging receiver), and another for communicating via the wireless network, or it may use a single processor for at least some communication with both the SMLC and the GPS satellites.

The functionality of the invention, in both the mobile station and the SMLC, is typically resident in what is often called the application layer of a layered protocol, by which the mobile and the cellular network (and in particular the SMLC) communicate.

BRIEF DESCRIPTION OF THE DRAWINGS

The above and other objects, features and advantages of the invention will become apparent from a consideration of the subsequent detailed description presented in connection with accompanying drawings, in which:

FIG. 4 is a flow chart of a method for use by a mobile station in obtaining navigation assistance from a navigation assistance server of a cellular network, according to the invention, or for use by the navigation assistance server, according to the invention.

FIG. 5 is a block diagram of an apparatus for use by a mobile station in obtaining navigation assistance from a navigation assistance server of a cellular network, according to the invention, or for use by the navigation assistance server, according to the invention.

DETAILED DESCRIPTION

Figure 1:
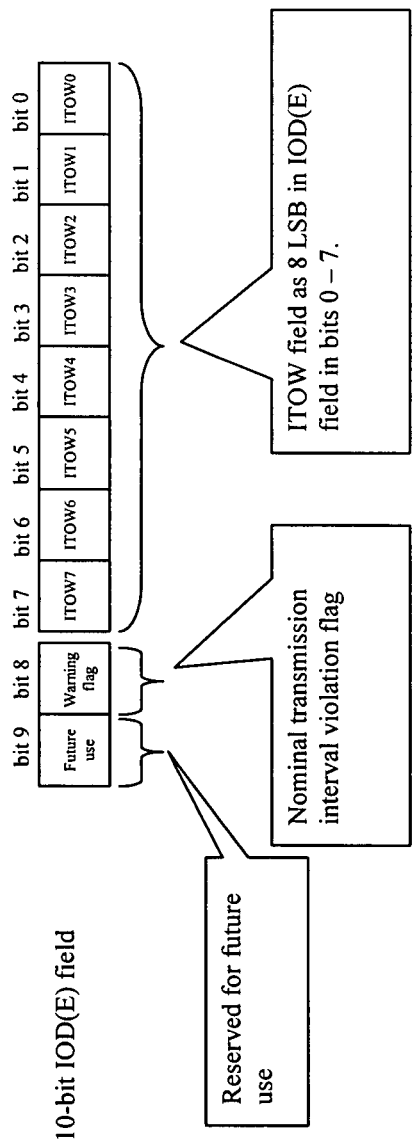
FIG. 1 is a schematic illustration of a IOD-E (Issue of Data-Ephemeris) IE/field according to the invention, based on an ITOW value for ephemeris data.

The invention is described here in the context of a mobile station equipped for cellular communication with a cellular network, and including what is commonly called an A-GPS receiver, i.e. a GPS receiver (or what is commonly called a GPS") equipped to receive not only ranging signals from satellites, but also to receive navigation assistance from a Serving Mobile Location Centre (SMLC) of the cellular network via cellular communication. However, the invention should be understood as of use in case of other than cellular communication for obtaining navigation assistance, and should be understood as being of use in other than a GPS, but instead, any GNSS that uses signals that convey the same information as the modernized signals of the (NAVSTAR) GPS.

In the context illustrated here, the invention provides a mechanism for use in identifying ephemeris information (i.e. for use in determining how current the ephemeris information is) in messages transmitted by a SMLC of a cellular network, to a MS that includes an A-GPS receiver, and for use in identifying ephemeris information in messages from the MS to the SMLC requesting additional or new ephemeris data. The mechanism is of use for ephemeris data sets from the "modernized" GPS signals, that is, from the data from L2C, L5 and L1C signals as described in IS-GPS-200D, IS-GPS-705 and IS-GPS-800 for the well-known Global Positioning System commonly referred to as GPS. It is also possible to use the mechanism on other satellite-based global positioning systems besides the GPS. As indicated above, the acronym "GPS" as used here is intended to refer to any satellite-based global positioning system, unless the context makes clear that the well-known (NAVSTAR) GPS is intended.

GPS satellite augmentation systems, such as Satellite Based Augmentation System (SBAS) and Japanese Quazi-Zenith Satellite System (QZSS), could transmit the modernized GPS signals and so could use the mechanism provided by the invention. The invention can also be applied to the Galileo Global Navigation Satellite System (GNSS) or any other GNSS or assisted GNSS (AGNSS) that includes signals like the L2C, L5 or L1C signals of GPS, i.e. signals that provide the same information.

The invention is thus relevant to assisted navigation systems in general, but especially to assistance data specifications and protocols in the well-known GERAN (Global System for Mobile Communication (GSM)-Edge Radio Access Network), UTRAN (Universal Mobile Telecommunications System (UMTS) Terrestrial Radio Access Network) and OMA (Open Mobile Alliance) SUPL (Secure User Plane for Location). As mentioned, the invention is, nonetheless, described here with particular reference to the well-known (NAVSTAR) GPS.

GPS L1 Ephemeris Data

All the pre-modernized assistance data protocols support only GPS, more specifically only the GPS L1 signal and its related navigation data. GPS L1 navigation data includes satellite ephemeris data for a satellite (called here GPS L1 ephemeris data) needed to precisely determine the position and velocity of a satellite as a function of time.

GPS L1 ephemeris data has the following characteristics, as described in ICD-GPS-200C (and in IS-GPS-200D):
  The nominal curve fit interval is 2 hours, but it can be even 26 or 98 hours depending on the satellite type (e.g. Block IIA, Block IIR-M) as described in Tables 20-XI and 20-XII of IS-GPS-200D.
  The length of curve fit interval is indicated by Fit Interval flag (Chapter 20.3.3.4.3.1 in IS-GPS-200D) and from the Issue-Of-Data Clock (IODC) values given in Tables 20-XI and 20-XII of IS-GPS-200D.

Issue-of-Data Clock (10b) and Issue-of-Data Ephemeris (IODE, the 8 LSB (Least Significant Bits) of IODC) unambiguously identify the current ephemeris data so that the MS may use IODE or (IODC) to check whether the ephemeris data from a specific satellite has changed.

The IODE of the GPS L1 ephemeris data has also two other uses in assistance data protocols than just to identify the current ephemeris and its curve fit interval. These are:

1) The IODE (8-bit IE/field) of GPS L1 ephemeris data is also used to identify DGPS correction data sets so that the MS can unambiguously check whether it can apply the DGPS corrections for the satellite ephemeris data in the MS's memory. DGPS corrections eliminate the errors in the pseudorange measurements due to atmospheric distortions and satellite position errors (ephemeris errors), so it is vital that the DGPS corrections are applied to the correct ephemeris data set. If the DGPS corrections are applied to ephemeris data different from the ephemeris data used to generate the DGPS corrections, the performance of the MS for positioning will become totally unpredictable, and can yield large positioning errors. Therefore, the DGPS corrections are provided with the IODE and the MS must check the IODE to avoid using DGPS corrections for the incompatible ephemeris data.

2) IODE (IODC) is used in assistance data requests to identify which ephemeris data the MS currently has in its memory so that the SMLC does not unnecessarily send the same ephemeris again in assistance data, but can instead send only the ephemeris data that have changes or are missing from the MS.

The use of IODE in DGPS corrections is described e.g. in 3GPP (Third Generation Partnership Program) TS (Technical Specification) 44.031 and the use of IODE in assistance data requests is described e.g. in 3GPP TS 49.031.

Modernized GPS Ephemeris Data

GPS modernization introduces at least three new signals for civilian use, namely L2C, L5 and L1C. These new signals broadcast also modernized versions of navigation data in which the ephemeris data has also been changed, referred to here as either CNAV-1 ephemeris (referring to the ephemeris in L2C and L5 signals) or CNAV-2 ephemeris (referring to the ephemeris in L1C signal).

CNAV-1 ephemeris has the following characteristics and differences compared to GPS L1 ephemeris data:

The curve fit interval is fixed to 3 hours, but the nominal transmission interval is 2 hours and it shall coincide with the first two hours of the curve fit interval as described in IS-GPS-200D, pp. 155 or in IS-GPS-705, pp. 55. So the nominal update rate of the ephemeris is two hours. It is possible for the ephemeris data to be updated in the satellite broadcast more frequently than every two hours, but theses cases are expected to be rare exceptions from the nominal functionality.

CNAV-1 does not contain any issue-of-data field to identify the data, but the identification of the ephemeris in the MS is practically based on the ephemeris age.

CNAV-1 does not contain any fields for the curve fit interval as it is based on a fixed value.

CNAV-2 ephemeris has the following characteristics and differences compared to GPS L1 Ephemeris Data:

The curve fit interval is fixed to 3 hours and the nominal transmission interval is 2 hours similar to CNAV-1 as described in IS-GPS-800, pp. 44.

CNAV-2 does not contain any fields for the curve fit interval as it is based on a fixed value, like CNAV-1.

CNAV-2 does not contain any issue-of-data field to identify the data similar to CNAV-1. CNAV-2, however, contains a 8-bit field called Interval Time Of Week (ITOW) that defines the number of two-hour epochs that have occurred since the transition from the previous week.

3GPP Activities

There are currently two so-called public GPS (and more accurately, GNSS) systems: NAVSTAR and GLONASS. The NAVSTAR system is owned by the United States and is managed by the Department of Defense. The GLONASS system is owned by the Russian Federation. While both NAVSTAR and GLONASS systems are global positioning systems, the NAVSTAR system is often referred to (in the U.S., anyway) as "GPS" because it was generally available first. Nevertheless, both systems are GPS systems, and so are both encompassed by the term GNSS, as explained above.

There are also satellite based augmentation systems (SBAS) that will provide additional information e.g. for GPS to improve positioning performance and integrity. SBAS satellites are typically geostationary satellites serving only a certain geographical region, thus not being globally available. Therefore, there are several SBASes either deployed or under development to cover various areas, such as Wide Area Augmentation System (WAAS) for North-America and Pacific areas, European Geostationary Navigation Overlay System (EGNOS) for European and North-Africa areas, and Multi-functional Satellite Augmentation System (MSAS) for the Asian region. SBAS satellites will use the same signal structures as e.g. GPS to enable the reception and demodulation of the SBAS signals with the same GPS receiver hardware needing only changes in the GPS receiver software.

As mentioned, GPS and GLONASS are both commonly referred to as a GNSS. A receiver supporting a GNSS will typically use either or both NAVSTAR and GLONASS to provide positioning, along with other components to improve accuracy and provide fast warning of problems.

The current work e.g. in 3GPP standardization forums is now focusing on near future GNSSes e.g. European Galileo, Russian GLONASS, SBASes and Japanese QZSS, to define assistance data messages and features based on these systems. These systems will be deployed (or re-deployed in the GLONASS case) during the next 4-6 years. Naturally, the assistance data and assistance requesting messages must also be redefined to be compatible with these coming systems.

Some of the current proposals include also a Differential GNSS (DGNSS) that will extend the differential corrections from GPS to other satellite systems and to modernized GPS.

The invention provides a mechanism for identifying the ephemeris data from the modernized GPS signals that can be used to unambiguously identify the ephemeris data set, used as an identification in DGNSS corrections, and used in assistance request messages to indicate which ephemeris data sets the MS already has.

Problem Addressed by the Invention

As indicated above, cellular standards currently have support only for GPS L1 ephemeris data and therefore all the assistance data and assistance data requesting messages are based on IODE identification only. The IODE is based on either an 8-bit or a 10-bit IE/field that can include the whole IODE and IODC value from GPS ephemeris broadcast.

It should be noted that the coming European Galileo system is also using a 10-bit Issue-of-Data identity for the ephemeris data making it very easy to add support for Galileo in the standards only by redefinition of certain fields (IODE+spare) without introducing any new IEs/fields or having new interpretations of the IEs/fields.

Table 1 shows the DGPS IE as currently defined in 3GPP TS 44.031 (Table A.15).

TABLE 1

DGPS Corrections

| Parameter | # Bits | Scale Factor | Range | Units | Incl. |
|---|---|---|---|---|---|
| The following fields occur once per message | | | | | |
| GPS TOW | 20 | 1 | 0-604799 | sec | M |
| Status/Health | 3 | 1 | 0-7 | — | M |
| N_SAT | 4 | 1 | 1-16 | — | M |
| The following fields occur once per satellite (N_SAT times) | | | | | |
| SatID | 6 | — | 0-63 | — | M |
| IODE | 8 | — | 0-255 | — | M |
| UDRE | 2 | — | 0-3 | — | M |
| PRC | 12 | 0.32 | ±655.04 | meters | M |
| RRC | 8 | 0.032 | ±4.064 | meters/sec | M |
| Delta PRC2 | 8 | — | — | — | M |
| Delta RRC2 | 4 | — | — | — | M |
| Delta PRC3 | 8 | — | — | — | M |
| Delta RRC3 | 4 | — | — | — | M |

Table 2 shows the Requested GNSS Assistance Data IE for requesting assistance data from the SMLC as currently defined in 3GPP TS 49.031, Chapter 10.10.

TABLE 2

Coding of Satellite Related Data in Requested GPS Assistance Data IE

| | 8 | 7 | 6 | 5 | 4 | 3 | 2 | 1 |
|---|---|---|---|---|---|---|---|---|
| Octet 5 | GPS Week | | | | Spare | | | |
| Octet 6 | GPS Week | | | | | | | |
| | NSAT | | | | | | | |
| | Spare | | | | | | | |
| Octet 7 | | | | | GPS_Toe | | | |
| Octet 8 | NSAT | | | | T-Toe limit | | | |
| Octet 9 | spare | | | | SatID 1 | | | |
| Octet 10 | | | | | IODE 1 | | | |
| ... | | | | | | | | |
| Octet 7 + 2n | spare | | | | SatID n | | | |
| Octet 8 + 2n | | | | | IODE n | | | |

As can be seen, an 8-bit number is reserved for the IODE. To provide for a 10-bit Galileo IOD, the current IODE and 2 spare bits can be allocated.

As the CNAV-1 and CNAV-2 do not contain IODE or IODC, the MS cannot pair DGNSS (DGPS) corrections with correct ephemeris and the MS cannot indicate which CNAV-1 or CNAV-2 ephemeris data it already has in its memory when requesting new assistance data.

Aspects of the Invention and Its Various Implementations

As indicated above, the invention provides a mechanism for identifying CNAV-1 and CNAV-2 ephemeris data in assistance data and assistance data requesting messages, based on the time elapsed since the previous week. This identification can be used to unambiguously identify different issues of the ephemeris data in assistance data messages, unambiguously identify the different issues of DGNSS corrections and to correctly pair the DGNSS corrections with correct ephemeris data, unambiguously indicate the ephemeris data currently in the MS's memory in assistance data requesting messages and to include a warning flag for the cases when the nominal transmission interval has been violated.

The invention is primarily intended for GPS L2C, L5 and L1C or like (SBAS, QZSS) signals, but the same concept could be implemented also for other satellite systems such as Galileo.

The invention provides functionality similar to the existing implementation based on IODE so that the expected performance and functionality of the positioning would not be different between ranging receivers using GPS L1 and those using the GPS modernization. The natural benefit of this is that the same message structure (10-bit IODE IE/field) could be used regardless of the satellite system.

Implementation follows the "ITOW-concept" proposed for CNAV-2 in IS-GPS-800. An identity of ephemeris similar to ITOW is proposed to identify the CNAV-1 ephemeris data issues from each other. An IE/field indicating the number of two-hour epochs since the previous week can unambiguously be used also for CNAV-1 as the default curve fit and nominal transmission intervals are the same as in CNAV-2.

CNAV-1 "ITOW" is reported with an 8-bit IE/field similar to CNAV-2 ITOW. The SMLC and the MS can easily derive this information from the satellite broadcast. The range of CNAV-1 "ITOW" is defined from 0 to 84 similar to ITOW in IS-GPS-800, pp. 48, Chapter 3.5.3.2.

Referring now to FIG. 1, the CNAV-2 ITOW and CNAV-1 "ITOW" are included as 8 LSB in the 10-bit Issue-of-Data (IOD) (could be named also a IODE) IE/field in assistance data messages.

The 10-bit IOD(E) IE/field (also indicated here as an IOD-E field) has still two bits in spare, which can be used for example for the following purpose:

Bit #8 of the IOD(E) can be used as a warning flag or as a further indication for the CNAV-1/CNAV-2 ephemeris to indicate whether the nominal transmission interval has been violated. In this case the satellites may have updated the ephemeris data broadcast before the full 2-hour epoch, which needs to be indicated in the IOD(E). Bit #8 of the IOD(E) is set to '1' if the nominal transmission interval has changed from the two-hour interval.

Bit #9 is reserved for future use.

The IOD IE/field is included in DGNSS IE, GNSS Navigation Model IE and in Requested GNSS Assistance Data IE as proposed e.g. in G2-060273 and G2-060274 as shown in Table 3 for ephemeris, in Table 4 for DGNSS and in Table 5 for assistance data requests. The IOD IE/field can now be used also for CNAV-1 and CNAV-2 ephemeris data without ambiguities.

TABLE 3

GNSS Navigation Model contents with IOD

| Parameter | # Bits | Scale Factor | Units | Incl. |
|---|---|---|---|---|
| Navigation Model Flow Control (once per message) | | | | |
| Num_Sat | 5 | 1 | — | M |
| Non-Broadcast Indication | 1 | — | — | M |
| Validity Period | 4 | 1 | h | C |
| $t_{oe/c}$_MSB | 5 | 21600 | sec | C |
| e_MSB | 7 | $2^{-8}$ | — | C |
| sqrtA_MSB | 6 | $2^7$ | $m^{1/2}$ | C |
| The following fields occur once per satellite (Num_Sat times) | | | | |
| SV ID | 6 | — | — | M |
| Carrier Frequency Index | 5 | — | — | O |
| SV Health | 5 | — | Boolean | M |
| IOD | 10 | — | — | M |

TABLE 3-continued

GNSS Navigation Model contents with IOD

| Parameter | # Bits | Scale Factor | Units | Incl. |
|---|---|---|---|---|
| GNSS Clock Model | See Table A.44.1 | — | — | M |
| GNSS Orbit Model | See Table A.44.2 | — | — | M |
| GNSS Orbit Accuracy Model | See Table A.44.3 | — | — | O |

TABLE 4

DGNSS Corrections with IOD

| Parameter | # Bits | Scale Factor | Range | Units | Incl. |
|---|---|---|---|---|---|
| The following fields occur once per message | | | | | |
| DGNSS Reference Time | 7 | 30 | 0-3570 | seconds | M |
| The following fields occur once per GNSS signal type (N_SGN_TYPE times) | | | | | |
| GNSS_Signal_ID | 2 | — | — | — | O (note 1) |
| Status/Health | 3 | 1 | 0-7 | — | M |
| N_SGN | 4 | 1 | 1-16 | — | M |
| The following fields occur once per GNSS Signal (N_SGN times) | | | | | |
| SV_ID | 6 | — | 0...63 | — | M |
| IOD | 10 | — | — | — | M |
| UDRE | 2 | — | 0-3 | — | M |
| PRC | 12 | 0.32 | ±655.04 | meters | M |
| RRC | 8 | 0.032 | ±4.064 | meters/sec | M |

Note 1:
Absence of this field means Galileo L.1 OS if GNSS_ID is Galileo

TABLE 5

Coding of Satellite Related Data with a 10-bit IOD

| | 8 | 7 | 6 | 5 | 4 | 3 | 2 | 1 |
|---|---|---|---|---|---|---|---|---|
| Octet 5 | | GNSS Week | | | | | GNSS ID | |
| Octet 6 | | | | GNSS Week | | | | |
| | | | | NSAT | | | | |
| | | | | Spare | | | | |
| Octet 7 | | | | GNSS_Toe | | | | |
| Octet 8 | | | NSAT | | | | T-Toe limit | |
| Octet 9 | | IOD 1 | | | GNSSSatID 1 | | | |
| Octet 10 | | | | IOD 1 | | | | |
| ... | | | | | | | | |
| Octet 7 + 2n | | IOD n | | | GNSSSatID n | | | |
| Octet 8 + 2n | | | | IOD n | | | | |

Figure 2A:
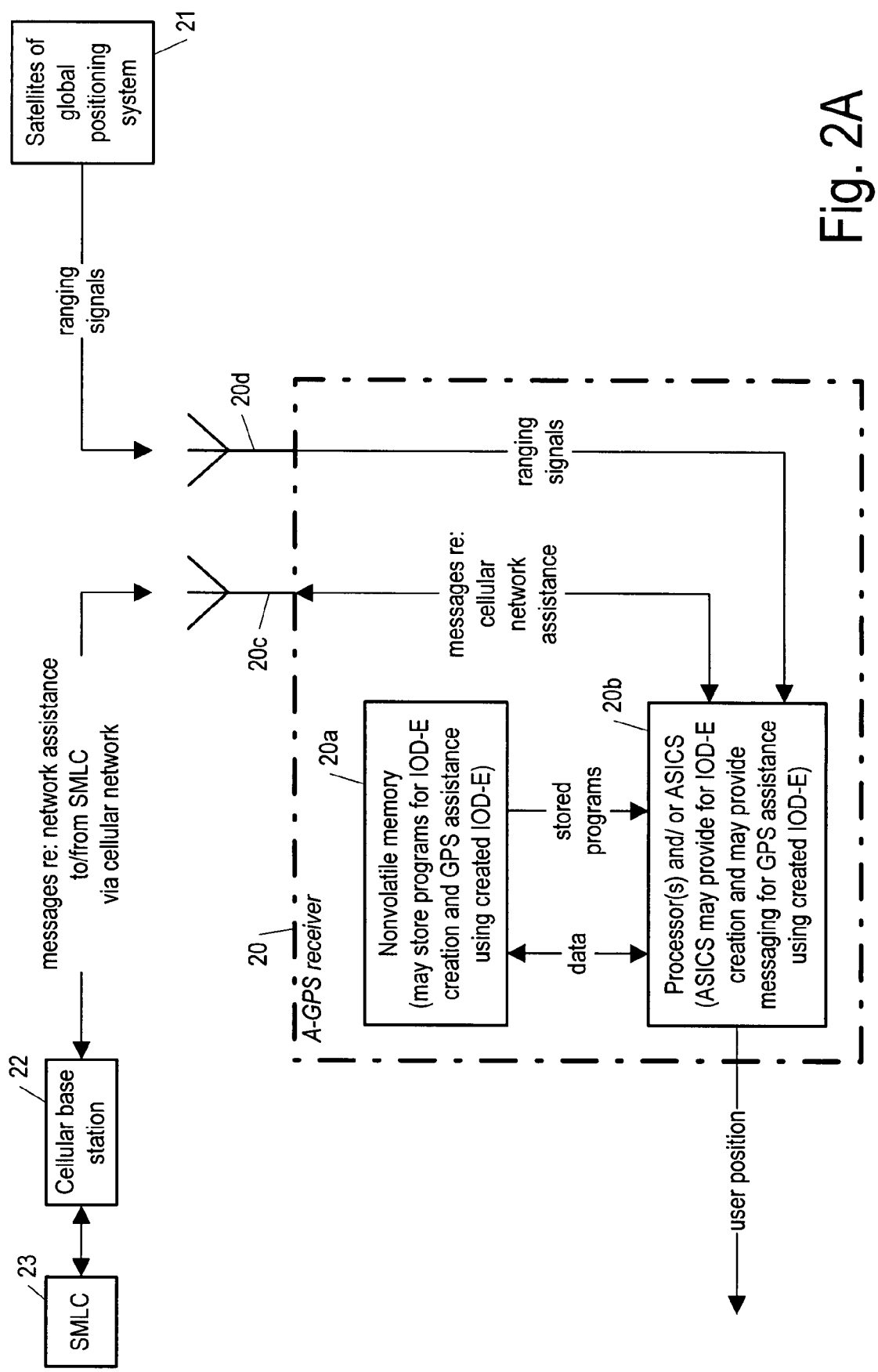
FIG. 2A is a block diagram of a ranging receiver (an A-GPS receiver) in communication with a satellite of a global positioning system and a serving mobile location centre (indicated as SMLC), via a cellular base station.

Referring now to FIG. 2A, an A-GPS receiver 20 (or a mobile station including GPS functionality) according to one aspect of the invention is shown as including a cellular antenna 20c and a GPS antenna 20d. It also includes non-volatile memory 20a and processors 20b for executing programs stored in the memory. Besides processors, the receiver can include ASICs 20b (application-specific integrated circuits) for providing some functionality. At least some of the processors and/or ASICs are configured to communicate via cellular communication over the cellular antenna 20c with a SMLC 23 via a cellular base station 22. At least some of the processors and/or ASICs are configured to process ranging signals received from satellites 21 of a global positioning system via the GPS antenna 20d. The processors 20b typically read and write data to the nonvolatile memory, data such as the ephemeris data. The memory 20a could hold programs for creating an IOD-E value according to the invention (i.e. using an ITOW value as the IOD-E, where the ITOW is derived for a CNAV-1 message, as explained below) for use in identifying ephemeris data, and programs for requesting and processing GPS assistance using an IOD-E according to the invention. Alternatively, the functionality for creating an IOD-E according to the invention, and/or for requesting and processing GPS assistance using an IOD-E according to the invention could be provided by one or more of the ASICs 20b.

Figure 2B:
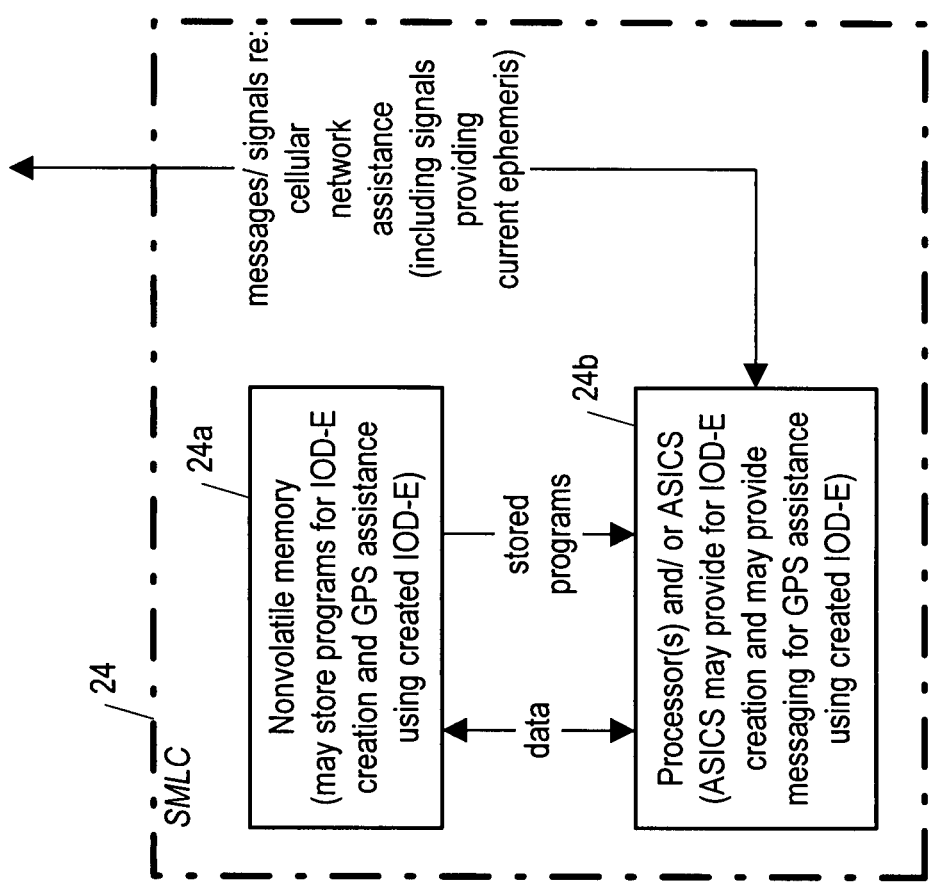
FIG. 2B is a block diagram of the SMLC of FIG. 2A, showing components relevant to the invention.

Referring now to FIG. 2B, the SMLC of FIG. 2A is shown in more detail, as also including non-volatile memory 24a and processors 24b for executing programs stored in the memory. Like the A-GPS receiver, the SMLC can include ASICs 20b for providing some functionality, in addition to the processors. The memory 24a could hold programs for creating an IOD-E value according to the invention for use in identifying ephemeris data, and programs for providing GPS assistance using an IOD-E according to the invention. Alternatively, the functionality for creating an IOD-E according to the invention, and/or for providing GPS assistance using an IOD-E according to the invention could be provided by one or more of the ASICs 24b.

Any functionality according to the invention, though indicated as provided by a module, may be software or hardware (i.e. an ASIC), and may be provided as a component of other module(s).

More specifically, the programs in the MS/A-GPS are for use in a SMLC or a MS, for determining an ITOW for a CNAV-1 signal. The programs also enable a MS to use the ITOW (either the ITOW provided with the CNAV-2, or that calculated for the CNAV-1) to uniquely identify ephemeris data in a request for assistance message. The corresponding programs in the SMLC so that the SMLC can use the IOD IE/field in the assistance data messages in a way that uniquely identifies the associated ephemeris.

As mentioned, the MS/A-GPS may be a device that serves as a ranging receiver and includes only that cellular or other wireless communication functionality required to request and obtain assistance from the SMLC, with which it communicates via e.g. a radio access network component of a cellular communication network, or the mobile may be a full-featured cellular or other wireless communication terminal that, as an added feature, includes a ranging receiver.

Figures 3A, 3B:
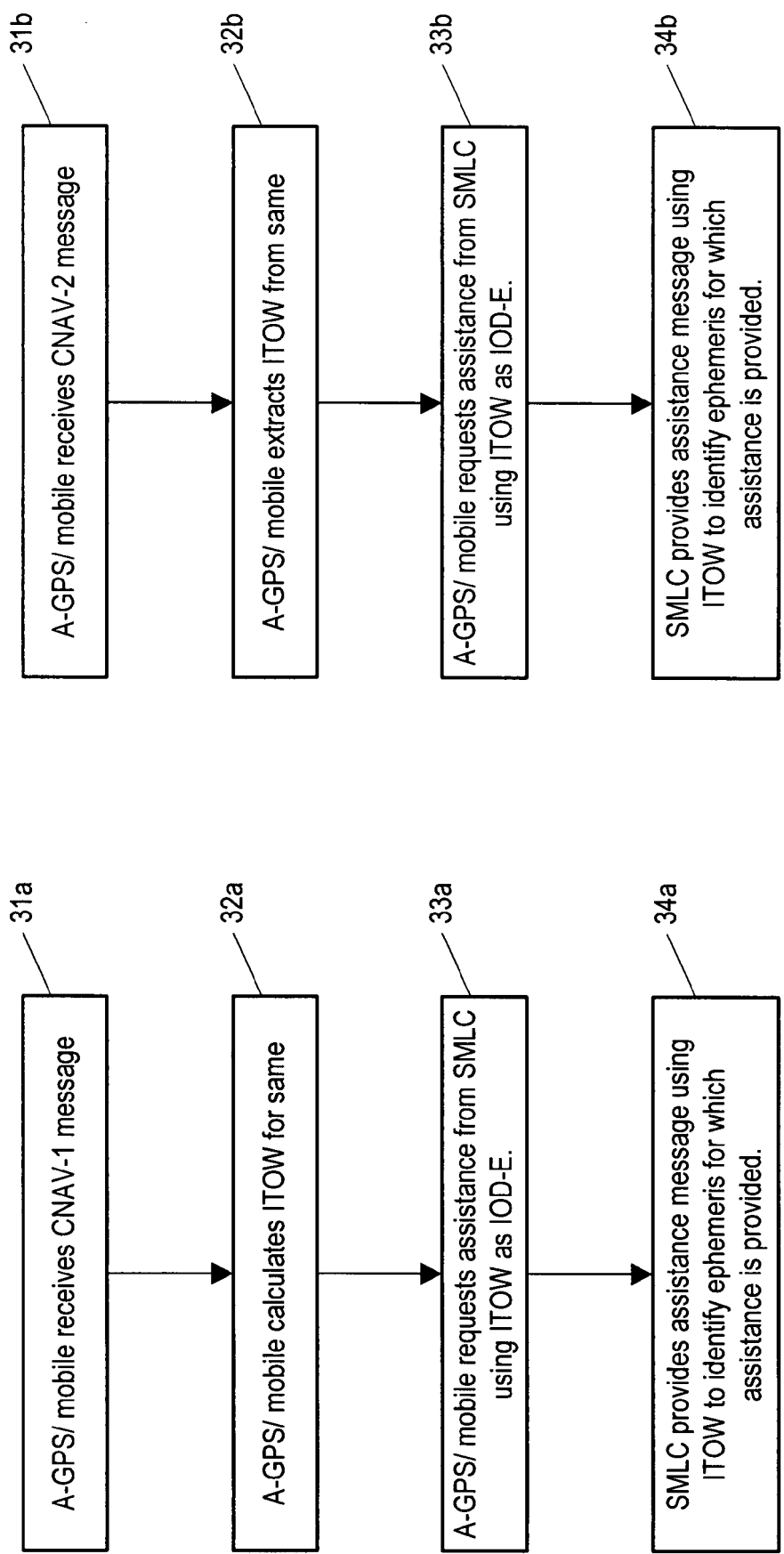
FIG. 3A is a flow chart for operation of an A-GPS receiver and the SMLC of FIG. 1, according to the invention, in respect to a so-called CNAV-1 message conveying ephemeris data.
FIG. 3B is a flow chart for operation of an A-GPS receiver and the SMLC of FIG. 1, according to the invention, in respect to a so-called CNAV-2 message conveying ephemeris data.

Referring now to FIG. 3A, according to an aspect of the invention in respect to CNAV-1 data, a method of operation of a SMLC and an A-GPS (or a MS having A-GPS functionality) includes a first step 31a in which the A-GPS/MS receives a CNAV-1 signal, and a next step 32*a* in which the A-GPS/MS calculates an ITOW value for the signal based on the time of broadcast of the signal (and using the time at the beginning of the week, which may also be calculated by the A-GPS) extracts ephemeris data and an ITOW included therein. The value of the ITOW so calculated is determined so as to have the same meaning as the same value of an ITOW provided in a CNAV-2 message. In a next step 33*a*, the A-GPS/MS sends a message to a SMLC requesting location assistance (via a radio access network of a cellular communication system), and identifies the ephemeris it has using the ITOW as an IOD-E field in the assistance request, i.e. using the ITOW as the 8 LSB of the 10-bit IOD field in the assistance request message. In a next step 34*a* the SMLC responds with an assistance message providing new ephemeris data or changes to the ephemeris data indicated by the A-GPS/MS, and uses the ITOW corresponding to the new or changed data as the IOD-E IE/field in the assistance message, i.e. as the 8 LSBs of the 10-bit IOD in the assistance message.

Referring now to FIG. 3B, according to an aspect of the invention in respect to CNAV-2 data, a method of operation of a SMLC and an A-GPS (or a MS having GPS functionality) includes a first step 31*b* in which the A-GPS/MS receives a CNAV-2 signal, and in a next step 32*b* the A-GPS/MS extracts ephemeris data and an ITOW included therein. In a next step 33*b*, the A-GPS/MS operates the same as for a CNAV-1 message (step 32A of FIG. 3A), i.e. it sends a message to an SMLC requesting location assistance (via a radio access network of a cellular communication system), and identifies the ephemeris it has using the ITOW as an IOD-E IE/field in the assistance request, i.e. using the ITOW as the 8 LSBs of the 10-bit IOD field in the assistance request message. In a next step 34*b*, just like in case of a CNAV-1 data, the SMLC responds with an assistance message providing new ephemeris data or changes to the ephemeris data indicated by the A-GPS/MS, and uses the ITOW corresponding to the new or changed data as the IOD-E IE/field in the assistance message, i.e. as the 8 LSBs of the 10-bit IOD in the assistance message.

In order to provide ephemeris information, the assistance server of the SLMC must or course be provided with the current ephemeris. For this, the assistance server may include a receiver for receiving navigation signals from the satellites of the GPS (or other GNSS), or the assistance server may be provided with the navigation signal by a satellite receiver separate from the assistance server.

From another perspective the invention provides a method as shown in FIG. 4 and a corresponding apparatus as shown in FIG. 5. The method and apparatus shown there are for use by a MS/A-GPS in obtaining navigation assistance from a navigation assistance server of a cellular or other wireless network or for use by the navigation assistance server. The method includes a step 41 of providing a time of week broadcast value (or other suitable time indication value) for a navigation signal, as an identifier of ephemeris (or ephemeris information) included in the navigation signal, and the apparatus includes a corresponding identifier creation module 51. In case of CNAV-1 and corresponding signals in other types of GNSS, the identifier is derived based on a value for the time of receipt of the navigation signal and a value for the time of the beginning of the week. In case of CNAV-2, the identifier is obtained directly from the navigation signal. The method also includes a step 42 of using the identifier as a basis for determining whether the ephemeris data is more or less current compared to some other ephemeris data, and the apparatus includes a corresponding navigation assistance module 52. The mobile station does this when it includes the identifier in a navigation assistance request message. The navigation assistance server of the SMLC does this when it compares the identifier with a corresponding identifier of the current ephemeris.

Advantages

The invention makes it possible to use the existing IODE IE/field and functionality e.g. for DGNSS (DGPS) correction pairing with ephemeris data for CNAV-1 and CNAV-2 ephemeris. The implementation is possible to do with the same 10-bit IE/field without having CNAV-1 and CNAV-2 specific IEs/fields in the assistance data messages and protocols.

The invention is directly applicable to RRLP (3GPP GERAN protocol for A-GNSS), RRC (Radio Resource Control) protocol (a 3GPP radio access network protocol including A-GNSS) and OMA SUPL protocol (a position data protocol for packet switched connection).

The invention is also forward-compatible, as there are reservations for future functionality.

Conclusion

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:
generating a time indication value for a first navigation signal, wherein the first navigation signal is an ephemeris type message;
generating a time indication value for a second navigation signal, wherein the second navigation signal is the ephemeris type message, and wherein the time indication values of the first and second navigation signals are provided in a same message structure for comparison, wherein the ephemeris type message is a CNAV-1 ephemeris type message which does not include a time indication value or a CNAV-2 ephemeris type message which includes a time indication value; wherein the generating of a time indication value for one or both of the first and second navigation signals includes deriving a value based on a value for a time of receipt of the respective navigation signal and a value for a time of a beginning of a week when the navigation signal is a CNAV-1 ephemeris type message, and obtaining the time indication value from a received navigation signal when the navigation signal is a CNAV-2 ephemeris type message;
providing, to an assistance server: a) the time indication value for the first navigation signal included as a first identifier of first ephemeris information included in the first navigation signal based on a first time interval between the first ephemeris information and an end of a week previous to the first ephemeris information, and b) the time indication value for the second navigation signal as a second identifier of second ephemeris information included in the second navigation signal based on a second time interval between the second ephemeris information and an end of a week previous to the second ephemeris information;
in an instance in which the time indication value for the first navigation signal is less than the time indication value for the second navigation signal, determining the second ephemeris information is more current than the first ephemeris information and updating a current ephemeris information as the second ephemeris information on the assistance server; and in an instance in which the time indication value for the first navigation signal is greater than the time indication value for the second navigation signal, determining the first ephemeris information is more current than the second ephemeris information and leaving the current ephemeris information on the assistance server unchanged.

2. A method as in claim 1, wherein the method is for use by a mobile station, and the method further comprises providing a navigation assistance request message including the time of week value as an indication of the ephemeris information obtained from the first navigation signal.

3. A method as in claim 1, wherein the method is for use by a navigation assistance server, and the method further comprises determining whether to provide current ephemeris information in response to a navigation assistance request from a mobile station, based on comparing the time indication value and a time indication value included in the navigation assistance request.

4. A method as in claim 1, wherein the time indication value is a time of week broadcast value and is provided as an 8-bit information element.

5. A method as in claim 1, wherein the time indication value is a time of week broadcast value, and when the time of week broadcast value is included in a navigation assistance request, the time of week broadcast value is provided as the eight least significant bits of an issue of data information element ordinarily included in the navigation assistance message.

6. A method as in claim 1, wherein the first navigation signal is a differential global navigation satellite system (DGNSS) message, and the method further comprises pairing the DGNSS message with a correct ephemeris data based on the generated first time indication value.

7. An application specific integrated circuit configured for operation according to claim 1.

8. The method of claim 1, further comprising:
in an instance in which an identifier of a first ephemeris information is a time indication value less than an identifier of a second ephemeris information, updating a current ephemeris information as the second ephemeris information; and
in an instance in which an identifier of a first ephemeris information is a time indication value greater than an identifier of a second ephemeris information, leaving the current ephemeris information unchanged.

9. A method according to claim 1, wherein the time indication and time indication value are compared without accessing content of the first ephemeris information and second ephemeris information.

10. A method according to claim 1, further comprising:
transmitting contents of the second ephemeris information to the assistance server in response to identification of the second ephemeris information as being more current than the first ephemeris information.

11. The method of claim 1, wherein the message structure is compatible across multiple global navigation satellite system signal types.

12. An apparatus comprising at least one processor and at least one memory including computer program code, the at least one memory and the computer program code configured to, with the processor, cause the apparatus to at least:

generate a time indication value for a first navigation signal, wherein the first navigation signal is an ephemeris type message;

generate a time indication value for a second navigation signal, wherein the second navigation signal is the ephemeris type message, and wherein the time indication values of the first and second navigation signals are provided in a same message structure for comparison, wherein the ephemeris type message is a CNAV-1 ephemeris type message which does not include a time indication value or a CNAV-2 ephemeris type message which includes a time indication value; wherein the apparatus is caused to generate a time indication value for one or both of the first and second navigation signals by deriving a value based on a value for a time of receipt of the respective navigation signal and a value for a time of a beginning of a week when the navigation signal is a CNAV-1 ephemeris type message, and obtaining the time indication value from a received navigation signal when the navigation signal is a CNAV-2 ephemeris type message;

provide, to an assistance server: a) the time indication value for the first navigation signal as a first identifier of first ephemeris information included in the first navigation signal based on a first time interval between the first ephemeris information and an end of a week previous to the first ephemeris information, and b) the time indication value for the second navigation signal as a second identifier of second ephemeris information included in the second navigation signal based on a second time interval between the second ephemeris information and an end of a week previous to the second ephemeris information;

in an instance in which the time indication value for the first navigation signal is less than the time indication value for the second navigation signal, determine the second ephemeris information is more current than the first ephemeris information and update a current ephemeris information as the second ephemeris information on the assistance server; and in an instance in which the time indication value for the first navigation signal is greater than the time indication value for the second navigation signal, determine the first ephemeris information is more current than the second ephemeris information and leave the current ephemeris information on the assistance server unchanged.

13. An apparatus as in claim 12, wherein the first navigation signal does not include a time indication value, and wherein the at least one memory and the computer program code are configured to, with the processor, cause the apparatus to at least derive the value for the time indication based on a value for the time of receipt of the first navigation signal and a value for the time of the beginning of the week.

14. An apparatus as in claim 12, wherein the apparatus is for use by a mobile station, and the at least one memory and the computer program code are configured to, with the processor, cause the apparatus to at least provide a navigation assistance request message including the time indication value as an indication of the ephemeris information obtained from the first navigation signal.

15. An apparatus as in claim 12, wherein the apparatus is for use by a navigation assistance server, and the at least one memory and the computer program code are configured to, with the processor, cause the apparatus to at least provide current ephemeris information in response to a navigation assistance request from a mobile station, based on comparing the time indication value and a time indication value included in the navigation assistance request.

16. An apparatus as in claim 12, wherein the time indication is a time of week broadcast value, and the time of week broadcast value is provided as an 8-bit information element.

17. An apparatus as in claim 12, wherein the time indication value is a time of week broadcast value, and when the time of week broadcast value is included in a navigation assistance request, the time of week broadcast value is provided as the eight least significant bits of an issue of data information element ordinarily included in the navigation assistance message.

18. An apparatus as in claim 12, wherein the first navigation signal is a differential global navigation satellite system (DGNSS) message, and the at least one memory and the computer program code are further configured to pair the DGNSS message with a correct ephemeris data based on the generated first time indication value.

19. An apparatus according to claim 12, wherein the at least one memory and the computer program code are further configured to, with the processor, cause the apparatus to at least:
in an instance in which an identifier of a first ephemeris information is a time indication value less than an identifier of a second ephemeris information, update a current ephemeris information as the second ephemeris information; and
in an instance in which an identifier of a first ephemeris information is a time indication value greater than an identifier of a second ephemeris information, leave the current ephemeris information unchanged.

20. The apparatus of claim 12, wherein the message structure is compatible across multiple global navigation satellite system signal types.

21. A computer program product comprising a computer readable storage structure embodying computer program code thereon for execution by a computer processor, wherein said computer program code comprises instructions for:
generating a time indication value for a first navigation signal, wherein the first navigation signal is an ephemeris type message;
generating a time indication value for a second navigation signal, wherein the second navigation signal is the ephemeris type message, and wherein time indication values of the first and second navigation signals are provided in a same message structure for comparison, wherein the ephemeris type message is a CNAV-1 ephemeris type message which does not include a time indication value or a CNAV-2 ephemeris type message which includes a time indication value; wherein the generating of a time indication value for one or both of the first and second navigation signals includes deriving a value based on a value for a time of receipt of the respective navigation signal and a value for a time of a beginning of a week when the navigation signal is a CNAV-1 ephemeris type message, and obtaining the time indication value from a received navigation signal when the navigation signal is a CNAV-2 ephemeris type message;
providing, to an assistance server: a) the time indication value for the first navigation signal as a first identifier of first ephemeris information included in the first navigation signal based on a first time interval between the first ephemeris information and an end of a week previous to the first ephemeris information, and b) the time indication value for a second navigation signal as the second identifier of second ephemeris information included in the second navigation signal based on a second time interval between the second ephemeris information and an end of a week previous to the second ephemeris information;
in an instance in which the time indication value for the first navigation signal is less than the time indication value for the second navigation signal, determining the second ephemeris information is more current than the first ephemeris information and updating a current ephemeris information as the second ephemeris information on the assistance server; and
in an instance in which the time indication value for the first navigation signal is greater than the time indication value for the second navigation signal, determining the first ephemeris information is more current than the second ephemeris information and leaving the current ephemeris information on the assistance server unchanged.

22. A computer program product according to claim 21, wherein computer program code further comprises instructions for:
in an instance in which an identifier of a first ephemeris information is a time indication value less than an identifier of a second ephemeris information, updating a current ephemeris information as the second ephemeris information; and
in an instance in which an identifier of a first ephemeris information is a time indication value greater than an identifier of a second ephemeris information, leaving the current ephemeris information unchanged.

* * * * *

UNITED STATES PATENT AND TRADEMARK OFFICE
CERTIFICATE OF CORRECTION

PATENT NO.          : 9,465,114 B2                         Page 1 of 1
APPLICATION NO.     : 11/978207
DATED               : October 11, 2016
INVENTOR(S)         : Syrjärinne et al.

It is certified that error appears in the above-identified patent and that said Letters Patent is hereby corrected as shown below:

In the Claims

Column 15,
Lines 52 and 53, "wherein the time indication and time indication value" should read --wherein the first time indication and second time indication value--.

Column 17,
Line 46, "wherein time" should read --wherein the time--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*